United States Patent
Sakano

[11] Patent Number: 5,908,652
[45] Date of Patent: Jun. 1, 1999

[54] METHOD FOR MODIFYING AROMA-CONTAINING GAS

[75] Inventor: Tadaaki Sakano, Suzuka, Japan

[73] Assignee: Ajinomoto General Foods Inc., Tokyo, Japan

[21] Appl. No.: 08/987,205

[22] Filed: Dec. 9, 1997

[30] Foreign Application Priority Data

Dec. 13, 1996 [JP] Japan ................................. 8-333217

[51] Int. Cl.[6] ............................. A23P 1/00; B01D 53/02; A61L 9/00
[52] U.S. Cl. ............................. 426/486; 96/141; 96/902; 422/5; 423/244.03; 423/245.1
[58] Field of Search .................................. 426/486, 595, 426/386; 96/136; 423/447.2, 245.1, 244.03; 95/141, 902; 422/5, 120

[56] References Cited

U.S. PATENT DOCUMENTS

| | | | |
|---|---|---|---|
| 1,636,300 | 7/1927 | Gewalt | 426/486 |
| 2,037,037 | 4/1936 | Moore | 99/11 |
| 2,855,313 | 10/1958 | Bach | 99/152 |
| 2,875,063 | 2/1959 | Feldman | 99/71 |
| 3,406,074 | 10/1968 | Klein et al. | 426/486 |
| 3,482,987 | 12/1969 | Pitchon et al. | 99/65 |
| 3,506,446 | 4/1970 | Champion | 426/486 |
| 4,015,022 | 3/1977 | Emich et al. | 426/460 |
| 4,261,709 | 4/1981 | Itoga et al. | 55/71 |
| 4,440,551 | 4/1984 | Henning et al. | 55/73 |
| 4,528,281 | 7/1985 | Sutt, Jr. | 502/402 |
| 4,629,476 | 12/1986 | Sutt, Jr. | 55/68 |
| 5,225,223 | 7/1993 | Vitzhum et al. | 426/386 |
| 5,238,888 | 8/1993 | Abe | 502/5 |

OTHER PUBLICATIONS

"Improvement of coffee aroma by removal of pungent volatiels using A–tyep zeolite." Sakano et al., Jounal of Food Science, (1996) 61 (2) 473–476.

Primary Examiner—Nina Bhat
Attorney, Agent, or Firm—Thomas A. Marcoux; Thomas R. Savoie

[57] ABSTRACT

A method for modifying an aroma-containing gas comprising volatile components recovered from coffee, characterized by contacting the aroma-containing gas with molecule sieve carbon oxidized with a strong acid is disclosed. This method removes undesirable components from the coffee aroma-containing gas by adsorption.

6 Claims, 1 Drawing Sheet

- ● Methyl mercaptan
- △ Acetaldehyde
- □ Methyl Formate
- ◆ Acetone
- ○ 2,3 butanedione
- ◇ 2,3- pentanedione

- ● Methyl mercaptan
- △ Acetaldehyde
- □ Methyl Formate
- ◆ Acetone
- ○ 2,3 butanedione
- ◇ 2,3- pentanedione

METHOD FOR MODIFYING AROMA-CONTAINING GAS

FIELD OF THE INVENTION

The present invention relates to a method for modifying an aroma-containing gas. More specifically, the invention relates to a method for modifying the odor of an aroma-containing gas, which has been recovered from a food material, especially, roasted coffee beans or green tea leaves, by contacting the aroma-containing gas with molecular sieve carbon oxidized with a strong acid.

BACKGROUND OF THE INVENTION

Sulfur compounds such as hydrogen sulfide and methyl mercaptan are contained in trace amounts in volatile components of food materials, including vegetables such as cabbages, tomatoes and potatoes, fruits such as passionfruits, grapes and grapefruits, and green tea or roasted coffee beans. These volatile components, including sulfur compounds, are collectively referred to as "an aroma" in this specification.

Gases containing a volatile aroma including hydrogen sulfide and methyl mercaptan (hereinafter called "aroma-containing gases or an aroma-containing gas" in the context) evolve during steps for treating or processing food materials such as coffee, tea or citrus fruits. For the production of instant coffee or liquid coffee, for example, an aroma-containing gas occurs during a treating or processing step, e.g., when coffee beans are roasted; when roasted coffee beans are ground by means of a mill; when water (normally 80 to 100° C.) is poured over ground coffee beans to take water-soluble substances, with the result that gases mainly containing air or carbon dioxide, which lie in the gaps between the ground coffee beans or exist in the cells of the beans, are purged with water; or when steam is blown into ground coffee for steam distillation.

It is customary practice to recover these aroma-containing gases, and add aroma components to an aqueous solution containing a coffee extract before drying, or coffee powder after drying, thereby enhancing the flavor of coffee drinks. This practice is described, for example, in U.S. Pat. Nos. 3,077,405 and 3,769,032.

A method is also known in which the aroma-containing gas taken from coffee is condensed using a heat exchanger with liquid nitrogen as a refrigerant so that it is recovered as an aroma-containing frost, and the recovered frost is used for addition to triglycerides or edible oils or fats (U.S. Pat. Nos. 3,021,218 and 4,551,344). For the production of soluble powders or drinks from food materials other than coffee, it has been attempted to recover aroma components during the processing step by various methods.

If the recovered aroma contains large amounts of sulfur compounds such as hydrogen sulfide and methyl mercaptan, the step of concentrating this aroma may give rise to an irritating foul smell which is different from a fragrance inherent in the food material. As an attempt at improving this problem in quality, the following techniques are disclosed: U.S. Pat. No. 2,875,063 describes a method of removing hydrogen sulfide by contacting an aroma-containing gas, recovered from a food material, with spiral cuttings of copper. Japanese Laid-Open Patent Publication No. 123109/93 describes a method which comprises mixing a small amount of an edible oil or fat with a frost that has been obtained by the condensation of the aroma-containing gas with liquid nitrogen, thereby transferring the smelly components to the edible oil or fat to remove them. With the former method, however, methyl mercaptan, the substantial cause of the smell, is not removed, and it is required to treat an organic waste liquor produced during the regeneration of the copper material. The latter method is difficult to carry out commercially, because of increased costs involved for the losses of the edible oil or fat and the aroma components, as well as the complexity of the procedure. U.S. Pat. No. 5,008,125 describes a method of treating a liquid condensate of volatile components, recovered from coffee, with microporous carbon, but its invention clearly differs from the present invention in the object to be treated and in the requirements for the adsorbent used.

An adsorption operation using activated carbon or the like is generally used for the removal of various smelling components. For removal of sulfur compounds, in particular, there are disclosed methods of promoting the adsorption of sulfur compounds by impregnating the surface of ordinary activated carbon with a metal salt of Mn, Cu, Cr, Ni or Fe (Japanese Patent Publication Nos. 137089/78, 4727/85 and 729/87). It has been disclosed that sulfur compounds are effectively removed by the use of activated carbon impregnated with iodine or bromine or a compound thereof (Japanese Patent Publication Nos. 20297/80 and 2368/82). These methods of removal using impregnated activated carbon, however, involve removal based on a chemical reaction between the impregnant and the sulfur compounds, and may present with a reaction with aroma components other than the sulfur compounds, deteriorating the odor. Furthermore, the activated carbon, the carrier, has a broad pore distribution, thus adsorbing and removing aroma components other than the sulfur compounds, resulting in the elimination of the odor itself.

SUMMARY OF THE INVENTION

It is an object of this invention to provide a method for modifying an aroma-containing gas by selectively removing sulfur compounds, smelling substances contained in aroma components, the method being easy to perform commercially. It is another object of the invention to provide a method which improves the quality of processed products or drinks by utilizing the modified aroma-containing gas during a food production process.

The present invention can be achieved by contacting an aroma-containing gas, which comprises volatile components recovered from a food material, with molecule sieve carbon oxidized with a strong acid. The food material may be coffee, green tea, or a citrus fruit.

When the food material is coffee, the aroma-containing gas is a gas generated during the roasting of coffee beans, a gas generated during the grinding of roasted coffee beans, a gas generated during the supply of water or a coffee extract (normally 80 to 100° C.) to ground roasted coffee, a gas generated during the supply of steam to ground roasted coffee, or a mixed gas comprising one or more of these gases.

DETAILED DESCRIPTION OF THE INVENTION

Figure 1:
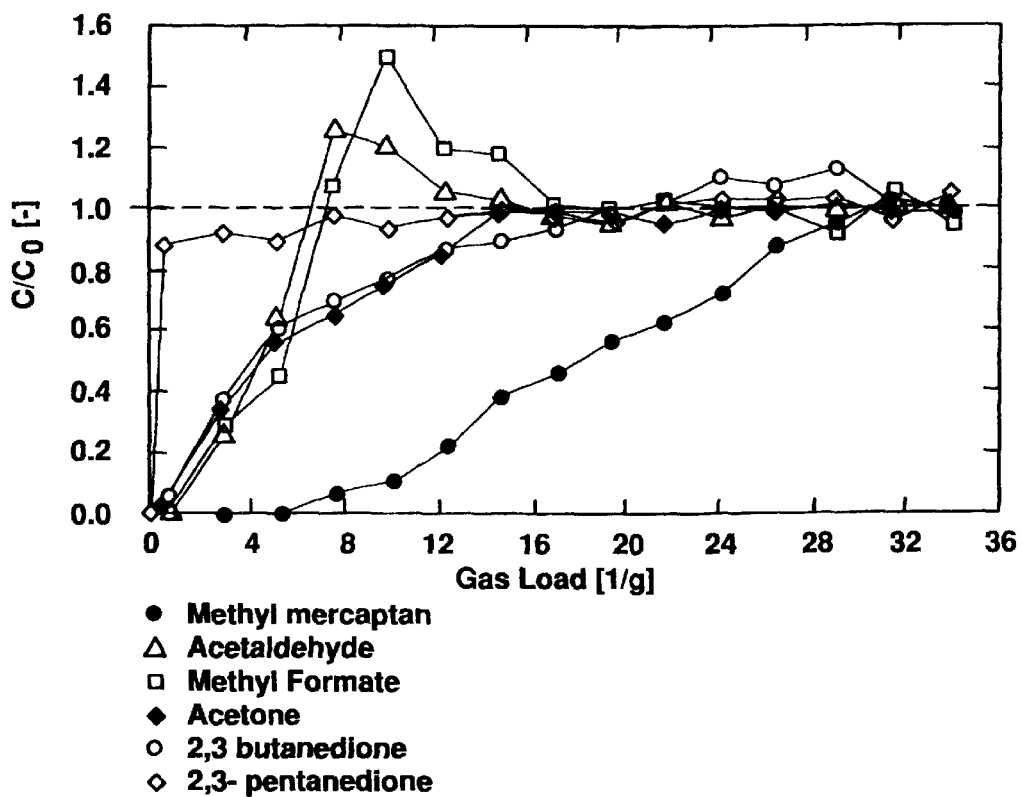
FIG. 1 is a graph showing the breakthrough curves of coffee aroma components in the oxidized molecular sieve carbon.

The present invention will be described in more detail. The inventor has conducted extensive studies to solve the aforementioned problems. As a result, he has found that when molecular sieve carbon is subjected to liquid phase oxidation using a strong acid such as nitric acid or sulfuric acid, and the so treated molecular sieve carbon is used for adsorption of the aroma-containing gas, sulfur compounds, such as hydrogen sulfide and methyl mercaptan, are selectively removed, while the coexisting volatile aroma components are minimally adsorbed. The present invention is based on this finding.

The invention is characterized in that the molecule sieve carbon oxidized with the strong acid is molecule sieve carbon in which the pores having pore diameters of 0.4 to 0.8 nm account for 70% or more, preferably 85% or more, of the total pore volume, and which has a total pore volume of 0.15 to 0.7 ml/g, preferably, 0.2 to 0.6 ml/g.

Available as the molecule sieve carbon used in oxidation according to the invention is activated carbon in which 70% or more of the pore volume comprises uniform, slit-shaped micropores having pore diameters of 0.4 to 0.8 nm. Such molecule sieve carbon has already been marketed (e.g. Molsievon, Takeda Chemical Industries, Ltd.), and many methods for its production have been disclosed in the past with a timber or coal as the starting material (Japanese Laid-Open Patent Publication Nos. 130226/81, 42514/82, 129816/82, 175714/82, 45914/84, 7938/85, 68312/86, 191510/86, 251507/86 and 108722/87). Ordinary molecular sieve carbon is, in most cases, in the shape of molded pellets, but may be in a ground form in the invention. Activated carbon fibers are also included in the molecular sieve carbon, as far as they have similar pore characteristics.

Various methods may be used for the oxidation of molecular sieve carbon with the strong acid in the invention. Concretely, the oxidation is performed by immersing molecular sieve carbon in an aqueous solution of a strong acid, such as an aqueous solution of nitric acid with a concentration of 1 normal (N) or more, preferably 5N or more, more preferably 13 to 23N, an aqueous solution of sulfuric acid with a concentration of 1N or more, preferably 5N or more, more preferably 18 to 36N, or any mixture of these acids.

The mixing ratio for the immersion is suitably molecular sieve carbon:aqueous solution of strong acid=about 1:10 to 1:25 by weight. The oxidation reaction in this case is preferably performed at as high a temperature as possible, i.e., the boiling temperature of the aqueous solution of strong acid, so that oxidation proceeds rapidly. However, this temperature condition is not essential.

When the reaction is performed using a 13.2N aqueous solution of nitric acid in a 10-fold amount at the boiling temperature, 0.5 mol/kg or more of surface oxygen functional groups are obtained in about 2 hours. The completion of the oxidation reaction can be determined when, in the case of using an aqueous solution of nitric acid, production of a brown gas generated during the reaction, apparently $NO_2$, stops. After oxidation treatment, the molecular sieve carbon is taken out, and washed with distilled water thoroughly until the pH of the washings becomes 5 or higher. To remove the water content on the surface, the molecular sieve carbon is predried in a nitrogen gas atmosphere, and vacuum dried for more than 3 hours at about 100° C., whereupon it can be put to use.

The surface oxygen functional groups referred to in the invention are a carboxyl group, a phenolic hydroxyl group and a carbonyl group which have been bound to the carbon atoms on the surface of the activated carbon. These surface oxygen functional groups follow the classification by Boehm et al. The amounts and proportions of these surface oxygen functional groups are measured by titration-based analysis called Boehm's method (H. P. Boehm et al., Angew. Chem. Internat., Ed., 3, 669–677, 1964). Since molecular sieve carbon is treated at an elevated temperature of 500° C. or higher during its production process, its final product normally has few surface oxygen functional groups. The inventor has found that when molecule sieve carbon oxidized in the above-described manner has surface oxygen functional groups in a total amount of 0.5 mol/kg or more on the carbon surface, and the proportion of the surface oxygen functional groups detected as phenolic hydroxyl groups is 60 mol % or more, this oxidized molecule sieve carbon is consistent with the object of the invention. More preferably, when the oxidized molecule sieve carbon has surface oxygen functional groups in a total amount of 1.0 mol/kg or more, and the proportion of the surface oxygen functional groups detected as phenolic hydroxyl groups is 75 mol % or more, the object of the invention has been found achievable more effectively.

The removal of smells from the aroma-containing gas is performed by charging the oxidized molecule sieve carbon into a column of stainless steel or glass, and passing the aroma-containing gas through the column continuously. The degree of removal of sulfur compounds can be confirmed by analysis using a gas chromatograph equipped with an FPD detector.

EXAMPLES

The present invention will be described in greater detail by reference to Examples, which do not limit the invention.

Example 1

20 Grams of MSC5A ("Molsievon" 5A, Takeda Chemical Industries, effective pore diameter 0.6 nm, pellets, 8–12 mesh) was ground, and sifted to obtain the product of 16–24 mesh. It was immersed in 500 ml of a 13.2N solution of nitric acid, and treated for 3 hours at the boiling temperature to prepare oxidized molecular sieve carbon. The pore properties, and the amounts of surface oxygen functional groups, of the resulting oxidized molecular sieve carbon are shown in Table 1. 0.5 Gram of the oxidized molecular sieve carbon was charged into a stainless steel column with an internal diameter of 6 mm and a height of 100 mm. An extractor filled with 250 kg of ground roasted coffee was supplied with hot water of 95° C. from below, and during the supply, a gas containing coffee aroma components was recovered from the top of the extractor by a vacuum pump under reduced pressure of −500 mmHg. This gas was passed through a heat exchanger cooled to 5° C., and then charged into a 400-liter stainless steel container. At room temperature, this gas was flowed into the above-mentioned stainless steel column at a constant flow rate of 100 ml/min. Changes over time in the respective aroma components in the gas at the column exit are shown in FIG. 1. The vertical axis of FIG. 1 indicates the ratio of the concentration at the column exit to the concentration at the column entrance of each component, ($C/C_0$). The horizontal axis of FIG. 1 shows the amount of the aroma-containing gas supplied for unit weight of the oxidized molecular sieve carbon. FIG. 1 demonstrates that with the oxidized molecular sieve carbon, methyl mercaptan, the cause of a bad smell, is eluted markedly behind other aromatic components. That is, it was possible to selectively separate methyl mercaptan from the gas containing the coffee aroma components.

Example 2

50 Grams of molecular sieve carbon ("Molsievon" 4A, Takeda Chemical Industries, effective pore diameter 0.5 nm, pellets, 8–12 mesh) was immersed in 500 ml of a 6.6N solution of nitric acid, and treated for 5 hours at the boiling temperature to prepare oxidized molecular sieve carbon. The pore properties, and the amounts of surface oxygen functional groups, of the resulting oxidized molecular sieve carbon are shown in Table 1.

Example 3

10 Grams of the same oxidized molecular sieve carbon as in Example 1 was charged into a stainless steel column with an internal diameter of 16.5 mm and a height of 600 mm. While fresh roasted coffee beans were being ground by a mill, a gas generated during the grinding was passed through

TABLE 1

Results of analysis of oxidized activated molecular sieve carbon

| | Pore properties | | | Surface oxygen functional groups | | | | |
|---|---|---|---|---|---|---|---|---|
| Adsorbent | Micropore volume [ml/g] | Total pore volume [ml/g] | Average pore width [mm] | I [mol/kg] | II [mol/kg] | III [mol/kg] | IV [mol/kg] | Total [mol/kg] |
| MSC4A | 0.112 | 0.124 | 0.52 | 0.015 | 0.002 | 0.010 | 0.002 | 0.029 |
| 6.6N nitric acid treated MSC4A | 0.165 | 0.189 | 0.56 | 0.127 | 0.002 | 0.750 | 0.160 | 1.038 |
| MSC5A | 0.119 | 0.145 | 0.68 | 0.010 | 0.000 | 0.004 | 0.024 | 0.039 |
| 13.2N nitric acid treated MSC5A | 0.211 | 0.264 | 0.64 | 0.119 | 0.097 | 0.957 | 0.265 | 1.438 |
| $O_2$ oxidized MSC5A | 0.187 | 0.221 | 0.67 | 0.008 | 0.046 | 0.119 | 0.256 | 0.429 |
| $H_2O_2$ oxidized MSC5A | 0.154 | 0.193 | 0.67 | 0.076 | 0.040 | 0.200 | 0.078 | 0.395 |
| ACC-20 | 0.610 | 0.740 | 0.76 | 0.032 | 0.008 | 0.249 | 0.071 | 0.854 |
| 1.0N sulfuric acid treated ACC-20 | 0.550 | 0.664 | 0.80 | 0.601 | 0.114 | 2.413 | 0.162 | 3.290 |

Figure 2:
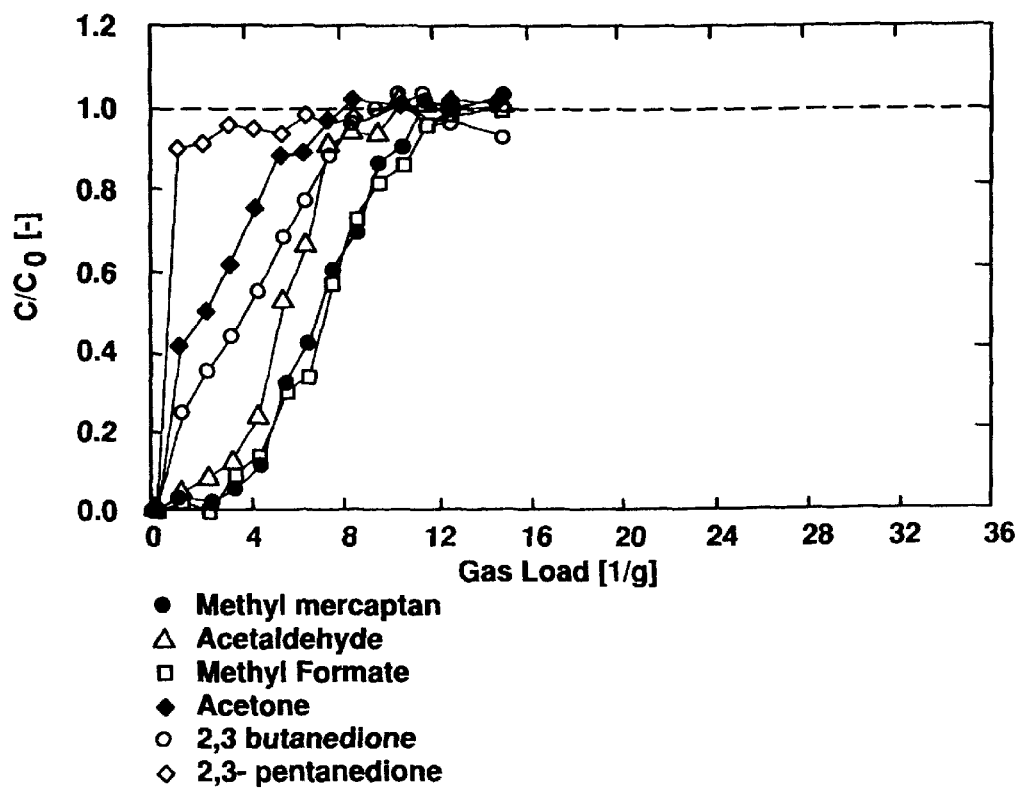
FIG. 2 is a graph showing the breakthrough curves of coffee aroma components in the molecular sieve carbon 5A.

I: Strongly acidic carboxyl group
II: Weakly acidic carboxyl group
III: Phenolic hydroxyl group
IV: Carbonyl group 20 Grams of the oxidized molecular sieve carbon was charged into a stainless steel column with an internal diameter of 16.5 mm and a height of 600 mm. The charged column was fed, from bottom, with a gas, which was generated during the grinding of fresh roasted coffee beans by a mill, for 120 minutes at a flow rate of 2 liters/min by means of a diaphragm type vacuum pump. The gas flowing out of the column was recovered into a 200-liter stainless steel container immediately after the start of the gas feeding. The gas so treated with the oxidized molecular sieve carbon and the untreated gas were compared by sensory evaluation that was made by a panel of experts. The treated gas was evaluated to have an organoleptically preferred, gentle odor with a significant decrease in an irritating smell like that of sulfur. The results of gas chromatographic analysis of aroma components in the gas before treatment and the gas after treatment are shown in FIG. 2.

TABLE 2

Results of analysis of coffee aroma gas

| Component | Before oxidized molecular sieve carbon treatment GC count (%) | | After oxidized molecular sieve carbon treatment GC count (%) | |
|---|---|---|---|---|
| Hydrogen sulfide | 6124 | (100) | 268 | (4.4) |
| Methyl mercaptan | 8042 | (100) | 394 | (4.9) |
| Acetaldehyde | 140904 | (100) | 132309 | (93.9) |
| 2,3-Butanedione | 5584 | (100) | 4467 | (80.0) |
| 2,3-Pentanedione | 33854 | (100) | 31857 | (94.1) |

Components such as hydrogen sulfide and methyl mercaptan markedly decreased.

the oxidized molecular sieve carbon-filled column at a flow rate of 2 liters/min by means of a diaphragm type vacuum pump. The gas flowing out of the column was blown through a glass filter of 150–250 μm into 50 g of a coffee oil placed in a 250 ml gas washing bottle. This procedure was performed continuously for 90 minutes. The oil recovered was sprayed in a proportion of 0.25% by weight over freeze-dried instant coffee, and 50 g of the sprayed powder was sealed up in a 200 ml glass container. The glass container was allowed to stand for a whole day at room temperature. Then, sensory evaluation of the odor when the seal of the glass container was broken for the first time was made by a panel of six experts. The results of evaluation are shown in Table 3.

TABLE 3

Results of sensory evaluation

| Item | Range | Control product | Treated product of Example 3 | Treated product of Example 3 |
|---|---|---|---|---|
| Strength of odor | 1–9 | 7.0 | 6.5 | 6.0 |
| Freshness of odor | 1–9 | 8.1 | 8.2 | 8.0 |
| R&G | 1–9 | 8.0 | 8.5 | 7.8 |
| Irritating odor | 1–9 | 8.5 | 5.0 | 4.0 |
| Sulfurous odor | 0–9 | 2.5 | 0.5 | 0.0 |

The values in the table represent the intensity of the properties of the odor (0: None, 1: Weak/Low, 9: Strong/High) as the average of the values given by the panel of six experts.

The sample prepared likewise without passage through the column packed with the oxidized molecular sieve carbon presented with an irritating odor similar to sulfur. Whereas the samples prepared by the method of the present invention had an organoleptically preferred, gentle odor with a significant decrease in an irritating smell like that of sulfur.

Example 4

20 Grams of molecular sieve carbon oxidized in the same manner as in Example 1 was packed into a stainless steel column with an internal diameter of 16.5 mm and a height of 600 mm. An aroma-containing gas was generated from 250 kg of roasted ground coffee by humidifying it, from above, with hot water of 90° C. under reduced pressure. This gas was passed for 15 minutes through a propylene glycol-cooled condenser of 5° C. by means of a diaphragm type vacuum pump. The water content in the gas was condensed by 956 g. The dehumidified aroma-containing gas was passed from the bottom of the column for 150 minutes at a flow rate of 2 liters/min. The gas flowing out of the column was recovered with a coffee oil in the same manner as in Example 3. An odor-fortified oil which was not passed through the column packed with the oxidized molecular sieve carbon was prepared similarly as a control. The aromatized oils were each diluted 1:3 with a coffee oil, sprayed in a proportion of 0.25% by weight over freeze-dried coffee powder, and sealed up in a glass container. A reduction in an irritating odor resembling sulfur was confirmed.

Example 5

20 Grams of activated carbon fibers (ACC-20, Nippon Kynol Inc., effective pore diameter 0.8 nm) was immersed in 500 ml of a 1.0N aqueous solution of sulfuric acid, and oxidized for 5 hours at the boiling temperature. The pore properties, and the amounts of surface oxygen functional groups, of the resulting oxidized activated carbon fibers are shown in Table 1. 10 g of the oxidized activated carbon fibers was used to treat an aroma-containing gas in the same way as in Example 4. The resulting aroma-fortified oil was sprayed over freeze-dried instant coffee, and the sprayed powder was sealed up in a glass container. Sensory evaluation of the odor when the glass container was unsealed was made by a panel of six experts. The results of evaluation are shown in Table 3. In this case, a more reduction in the aroma components than in Example 3 was noted, and organoleptically a gentle odor with by far a weaker feeling of irritation was presented.

Comparative Example 1

This is a control in which adsorption was performed using nonoxidized molecular sieve carbon for comparison with the effect of oxidation in the oxidized molecular sieve carbon of the present invention described in Example 1. The pore properties, and the amounts of surface oxygen functional groups, of the resulting ground molecular sieve carbon are shown in Table 1. This molecular sieve carbon was packed in an amount of 1.0 g into the same column as in Example 1, and the same procedure was performed. Changes over time in the respective aroma components in the gas at the column exit are shown in FIG. 2. The vertical axis of FIG. 2 indicates the ratio of the concentration at the column exit to the concentration at the column entrance of each component, ($C/C_0$). The horizontal axis of FIG. 2 shows the amount of the aroma-containing gas supplied for unit weight of the nonoxidized molecular sieve carbon. FIG. 2 demonstrates that the nonoxidized molecular sieve carbon was unable to selectively separate methyl mercaptan, the cause of bad smell, from the gas containing aroma components.

Comparative Example 2

10 Grams of molecular sieve carbon ("Molsievon" 5A, Takeda Chemical Industries, effective pore diameter 0.6 nm, pellets, 8–12 mesh) was treated for 3 hours at 350° C. while passing an oxygen gas therethrough at a flow rate of 100 ml/min. The pore properties, and the amounts of surface oxygen functional groups, of the resulting molecular sieve carbon are shown in Table 1. This molecular sieve carbon was used to treat a gas recovered in the same way as in Example 1. However, selective removal of methyl mercaptan did not take place.

Comparative Example 3

50 Grams of molecular sieve carbon ("Molsievon" 5A, Takeda Chemical Industries, effective pore diameter 0.6 nm, pellets, 8–12 mesh) was immersed in 500 ml of a 30% aqueous solution of hydrogen peroxide for 24 hours. The pore properties, and the amounts of surface oxygen functional groups, of the resulting molecular sieve carbon are shown in Table 1. This molecular sieve carbon was used to treat a gas recovered in the same way as in Example 1. However, selective removal of methyl mercaptan did not take place.

I claim:

1. A method for modifying an aroma-containing gas comprising volatile components recovered from a food material, said method comprising contacting said aroma-containing gas with molecular sieve carbon oxidized with a strong acid.

2. The method of claim 1, wherein said food material is coffee.

3. The method of claim 1, wherein said aroma-containing gas is selected from the group consisting of a gas generated during the roasting of coffee beans, a gas generated during the grinding of roasted coffee beans, and a gas generated during the supply of water or a coffee extract or steam to ground roasted coffee and combinations thereof.

4. The method of claim 1, wherein said molecular sieve carbon oxidized with said strong acid is molecular sieve carbon in which the pores having pore diameters of 0.4 to 0.8 nm account for 70% or more of the total volume, and which has a total pore volume of 0.15 to 0.7 ml/g.

5. The method of claim 1, wherein molecular sieve carbon has surface oxygen functional groups in a total amount of 0.5 mol/kg or more on the carbon surface, and the proportion of the surface oxygen functional groups detected as phenolic hydroxyl groups is 60 mol % or more.

6. The method of claim 1, wherein the oxidation of molecular sieve carbon is performed by immersing molecular sieve carbon in an aqueous solution of a strong acid selected from the group consisting of an aqueous solution of nitric acid with a concentration of at least 1N, an aqueous solution of sulfuric acid with a concentration of at least 1N, and any mixture of these acids.

\* \* \* \* \*